United States Patent [19]
Tsuchishima et al.

[11] Patent Number: 5,778,751
[45] Date of Patent: Jul. 14, 1998

[54] MOUNTING STRUCTURE FOR CUTTING BLADE OF DICING APPARATUS

[75] Inventors: Jiro Tsuchishima; Kiyotaka Chiba, both of Mitaka, Japan

[73] Assignee: Tokyo Seimitsu Co., Ltd, Tokyo, Japan

[21] Appl. No.: 775,278

[22] Filed: Dec. 31, 1996

Related U.S. Application Data

[63] Continuation of Ser. No. 586,305, Jan. 17, 1996, abandoned, which is a continuation of Ser. No. 205,632, Mar. 4, 1994, abandoned.

[30] Foreign Application Priority Data

Mar. 8, 1993 [JP] Japan ...................... 5-046729

[51] Int. Cl.$^6$ ................... B26D 1/14; B26D 7/26
[52] U.S. Cl. .................. 83/666; 83/676; 83/698.41; 125/15; 451/342
[58] Field of Search ................ 83/698.41, 666, 83/676; 451/342; 125/15

[56] References Cited

U.S. PATENT DOCUMENTS

| | | |
|---|---|---|
| 1,409,758 | 3/1922 | Nichols . |
| 1,636,722 | 7/1927 | Thibaudeau ............ 83/698.41 X |
| 2,497,217 | 2/1950 | Hall ........................ 451/342 |
| 4,388,848 | 6/1983 | Albert . |
| 4,901,479 | 2/1990 | Helm ........................ 83/666 X |

FOREIGN PATENT DOCUMENTS

| | | |
|---|---|---|
| 131809 | 1/1985 | European Pat. Off. . |
| 2937045 | 4/1981 | Germany . |
| 57-3563 | 1/1982 | Japan . |
| 5-299501 | 11/1993 | Japan . |

*Primary Examiner*—Eugenia Jones
*Attorney, Agent, or Firm*—Nikaido, Marmelstein, Murray & Oram LLP

[57] ABSTRACT

A blade mounting structure in which a mounted blade is rotated in a well-balanced condition and further the blade can be easily attached to and detached from the apparatus is provided, which structure comprises a mount including a flange and a first cylindrical engagement portion and a first screw portion; a cutting blade including a second engagement portion; and a screw member including a second screw portion, wherein the cutting blade is mounted onto the mount so that the first engagement portion is engaged with the second engagement portion, and the second screw portion is screwed into the first screw portion and wherein the tolerance of the engagement portions, the thickness of the first engagement portion, the gap between the flange and the first engagement portion, and the diameter of the flange are selected to have a particular relationship such that the engagement portions are not engaged under an inappropriate contact condition when the blade is inserted into the mount.

1 Claim, 4 Drawing Sheets

MOUNTING STRUCTURE FOR CUTTING BLADE OF DICING APPARATUS

This application is a continuation of application Ser. No. 08/586,305, filed on Jan. 17, 1996, abandoned, which is a continuation of Ser. No. 08/205,632 filed on Mar. 4, 1994, abandoned.

BACKGROUND OF THE INVENTION

(1) Field of the Invention

The present invention relates to a mounting structure for a cutting blade of a dicing apparatus which conducts narrow-groove cutting and in which a cutting blade, in which abrasive grains made of diamond and other materials are fixed with nickel, is rotated at high speed.

(2) Description of the Related Art

A dicing apparatus is used for forming narrow grooves and separating a semiconductor wafer into IC chips. The blade of the dicing apparatus is a disk-shaped rotary blade made of abrasive grains of diamond which are fixed with nickel. The thickness of the outer portion of the cutting blade is several tens of microns. This blade is rotated by a spindle motor at high speed so as to cut narrow grooves. Therefore, an end portion of the blade wears away when the grooves are formed. Accordingly, it is necessary to replace the blade in accordance with the processing. For this reason, it is arranged that the blade portion can be attached to and detached from the spindle motor. In the dicing apparatus, the spindle motor is rotated at high speed. Therefore, it is necessary that the spindle motor is well-balanced when the blade is attached to the spindle motor. Consequently, a rotational center of the spindle motor and that of the blade are made to coincide with each other using an engagement structure so that the spindle motor is well-balanced. In the structure in which the blade is mounted, the mount is engaged with the spindle shaft, and then fixed with a nut.

In the blade mounting structure described above, all the operator must do is to engage the blade with the mount so as to fix it. Therefore, the blade can be easily replaced. In this case, the accuracy of a position of the center of the blade is determined by the accuracy of an engagement portion of the mount and the blade, and the perpendicularity of the blade with respect to the rotational shaft is determined by the accuracy of the flange and blade surfaces. Therefore, when the machining accuracy of the engagement portions of the flange surface and blade surface is improved, the blade 4 can be accurately attached to the mount.

However, there are several problems in the conventional blade mounting structure described above.

The first problem will be described as follows: Although the nut is positioned by the screws, the positioning accuracy determined by screws is lower than the positioning accuracy determined by engagement. As described above, the blade is attached to the mount through engagement so that the center of the blade can coincide with the rotational center. Therefore, the rotational balance of the blade can be maintained. However, the positioning accuracy of screws is not sufficiently high, so that the rotational balance is affected by the fixing condition of the nut. Since the spindle motor is rotated at high speed, it is necessary to maintain the rotational balance accurately. In the case where the rotational balance is not maintained sufficiently accurate, vibration is caused in accordance with rotation, and not only is the machining defective, but also the spindle motor and blade can be damaged.

The second problem is caused when the blade is automatically attached to and detached from the apparatus, which will be described as follows: In a factory in which semiconductor wafers are cut with a dicing apparatus, the operations are automated to reduce the manufacturing cost. In the case of cutting semiconductor wafers, the circumstances are the same. Automation is facilitated in the following manner: The semiconductor wafers are automatically supplied, and the patterns of the semiconductor wafers are automatically recognized, and then grooves are machined at predetermined positions.

The blades are consumable items. Therefore, it is necessary to replace blades when they wear. The operation of replacing a blade is also automated. When a blade is replaced in the blade mounting structure described above, it is necessary to remove and hold the nut, and then the blade is replaced. However, in the process of automation, it is very difficult to replace one part while another part is being held, as compared with a case in which a single part is replaced. For this reason, the structure of an apparatus used for automatically replacing a blade becomes complicated, and the cost is increased.

The third problem is caused when the workability of the blade detaching operation is improved, which will be described as follows: When the blade is mounted in the manner described above, the rotational balance is determined by an amount of gap of the engaging portion, that is, the rotational balance is determined by a tolerance of the gap. The smaller the tolerance of the engaging portion is reduced, the better the rotational balance is improved. However, in the case where the tolerance of the engagement portion is reduced, it becomes difficult to insert the blade into the mount. In general, a base of the blade is made of aluminum alloy. Therefore, when the blade is inserted diagonally, an inappropriate contact condition is caused and the engagement portion is damaged, and it becomes impossible to put the blade into practical use.

SUMMARY OF THE INVENTION

The present invention has been achieved in view of the above problems. An object of the present invention is to improve the blade mounting structure in a dicing apparatus.

A mounting structure for a cutting blade in a dicing apparatus according to the first aspect of the present invention comprises: a mount disposed at a fore end of a spindle motor rotating at high speed; a cutting blade attached to the mount; and a screw member to fix the cutting blade to the mount, and the mount and the screw member respectively includes engagement portions to be engaged with each other.

In the blade mounting structure of the first aspect, the screw member to press the cutting blade against the flange surface for fixation is also provided with the engagement portion, and the other engagement portion to be engaged with this engagement portion is also provided with the mount. Due to the foregoing, the center of the screw member coincides with the rotational center with high accuracy. Accordingly, the rotational balance is not affected by the mounting position of the screw.

A mounting structure according to the second aspect of the present invention comprises: a mount disposed at a fore end of a spindle motor rotating at high speed; and a cutting blade attached to the mount, and the cutting blade includes a screw portion screwed into a screw portion of the mount for fixation.

In the blade mounting structure of the second aspect, the cutting blade is provided with the screw portion, so that the cutting blade can be fixed by itself while the screw member is not required. That is, the cutting blade and the screw member are integrated. Due to the foregoing, when the cutting blade is detached, only the cutting blade may be held, so that the detaching operation can be easily conducted and automated.

A blade mounting structure according to the third aspect of the present invention comprises: a mount disposed at a fore end of a spindle motor rotating at high speed; a cutting blade attached to the mount; and a screw member, used when the cutting blade is mounted on the mount, at a position where an end of an engagement portion of the cutting blade comes into contact with an end of an engagement portion of the mount, when a flange surface and a blade surface are held in parallel, and then, the cutting blade is inclined with respect to the mount by an amount of a gap caused by an engagement allowance of the engaging portions, a portion of the blade surface comes into contact with the flange surface.

In the blade mounting structure of the third aspect, at a position where the engagement portions are contacted with each other in the case of insertion of the cutting blade, the cutting blade comes into contact with the mount when the cutting blade is inclined by an amount corresponding to a gap formed due to the tolerance of the engagement portion. Accordingly, at the position, there is no possibility that the blade is further inclined, and as a result, the engagement portions are appropriately contacted.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1A:
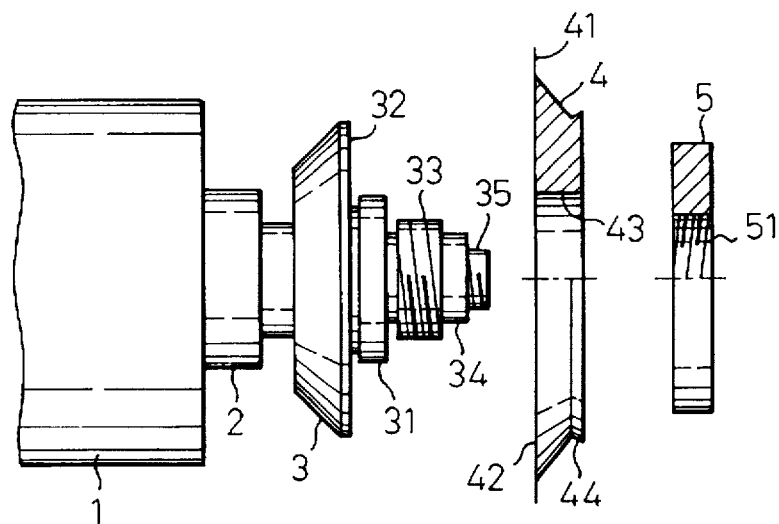
FIGS. 1A and 1B are views showing the conventional blade mounting structure.

Before proceeding to a detailed description of the preferred embodiments of the present invention, a prior art blade mounting structure will be described, with reference to the accompanying drawings relating thereto, for a clearer understanding of the differences between the prior art and the present invention. In the accompanying drawings, like or corresponding functional parts are indicated by the same reference characters and repetitive description thereof will be omitted.

Figure 1B:
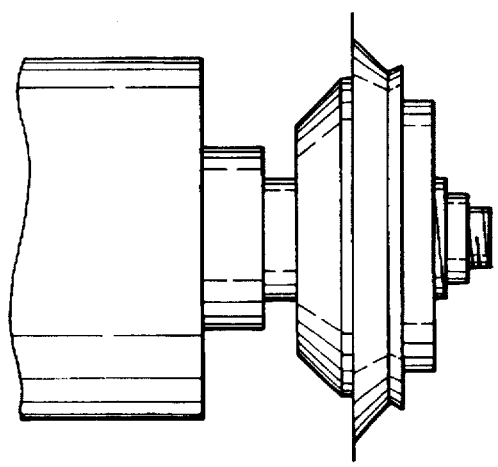

FIGS. 1A and 1B are views showing a conventional structure in which the blade is attached to the spindle of the dicing apparatus. FIG. 1A is a view showing a condition in which the blade is removed, and FIG. 1B is a view showing a condition in which the blade is attached.

In FIGS. 1A and 1B, reference numeral 1 indicates a main body of a spindle motor; 2 indicates a spindle shaft; 3 indicates a mount for mounting a blade, which is provided at an end of the spindle shaft 2; 4 indicates a blade; and 41 indicates a cutting edge. A blade in which the metal mount is provided with a cutting edge is referred to as a hub blade, however, it will be referred to as a blade in this specification, hereinafter. Reference numeral 5 indicates a nut to fix the blade 4. The mount 3 and blade 4 are respectively provided with engagement portions 31 and 43. When the engagement portion 43 is engaged with the engagement portion 31 of the mount 3, a rotational center of the spindle motor and a center of the blade 4 can be positioned to a tolerance of the engagement portion. A surface 32 coming into contact with the blade 4, the surface being perpendicular to a rotational shaft of the mount 3, is made in such a manner that the surface 32 is accurately perpendicular to the rotational shaft. Also, a surface 42 of the blade 4 coming into contact with the surface 32 of the mount 3 is made in such a manner that the surface 42 is highly accurately perpendicular to the rotational shaft. Under the condition that these surfaces are contacted with each other, the cutting edge of the blade 4 can be set highly accurately perpendicular to the rotational shaft. In this case, the surface 32 of the mount 3 perpendicular to the rotational shaft is referred to as a flange surface, and the surface 42 of the blade 4 perpendicular to the rotational shaft is referred to as a blade surface. Under the condition that the blade 4 is engaged with the mount 3, a screw 51 of the nut 5 is screwed into a screw 33 of the mount 3 so as to be fixed.

In the structure shown in FIGS. 1A and 1B in which the blade 4 is mounted, the mount 3 is also engaged with the spindle shaft 2, and then fixed with a nut 34. Reference numeral 35 is a screw used for the fixation. Another method for attaching the mount 3 to the spindle shaft 2 is to press-fit the mount 3.

When the blade mounting structure shown in FIGS. 1A and 1B is adopted, all the operator must do is to engage the blade 4 with the mount 3 so as to fix it. Therefore, the blade 4 can be easily replaced. In this case, the accuracy of a position of the center of the blade 4 is determined by the accuracy of an engagement portion of the mount 3 and the blade 4, and the perpendicularity of the blade 4 with respect to the rotational shaft is determined by the accuracy of the flange and blade surfaces. Therefore, when the machining accuracy of the engagement portion, flange surface and blade surface is high, the blade 4 can be accurately attached to the mount 3. However, as described previously, there are several problems in the blade mounting structure illustrated in FIGS. 1A and 1B.

Figure 2A:
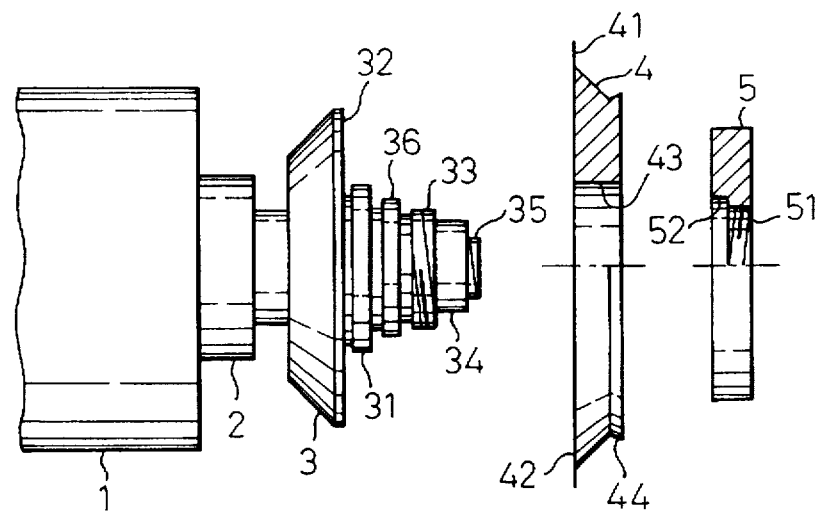
FIGS. 2A and 2B are views showing the first embodiment of the blade mounting structure of the dicing apparatus according to the present invention.
Figure 2B:
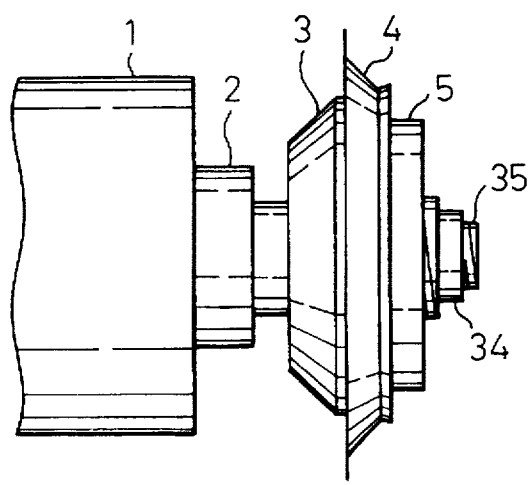

FIGS. 2A and 2B are views showing a blade mounting structure of a dicing apparatus which is the first embodiment of the present invention. FIG. 2A is a view showing a condition in which the blade is removed, and FIG. 2B is a view showing a condition in which the blade is attached.

In FIGS. 2A and 2B, reference numeral 1 indicates a main body of a spindle motor; 2 indicates a spindle shaft; 3 indicates a mount for mounting a blade, which is provided at an end of the spindle shaft 2; 34 indicates a nut; and 35 indicates a screw to fix the nut 34. In this embodiment, after the mount 3 has been engaged with the spindle shaft 2, the mount 3 is fixed with a nut 34.

Reference numeral 4 indicates a blade; 41 indicates a cutting edge; and 5 indicates a nut to fix the blade 4. The mount 3 is provided with a first engagement portion 31 and a third engagement portion 36, and the blade 4 is provided with a second engagement portion 43 to be engaged with the first engagement portion 31, and further the nut 5 is provided with a fourth engagement portion 52 to be engaged with the third engagement portion 36. When these engagement portions are engaged with each other, the centers of the rotational shaft, blade 4 and nut 5 are positioned to the tolerance of the engagement portions. The perpendicularity of a vertical surface 32 of the mount 3 coming into contact with the blade 4, is very accurate with respect to the rotational shaft. The perpendicularity of a surface 42 of the blade 4 coming into contact with the mount 3, is also very accurate with respect to the rotational shaft. When these surfaces are contacted, the cutting edge of the blade 4 can be set perpendicular with high accuracy. In this case, the surface 32 of the mount 3 perpendicular to the rotational shaft is referred to as a flange surface, and the vertical surface 42 of the blade 4 perpendicular to the rotational shaft is referred to as a blade surface. Under the condition that the blade 4 is inserted into the mount 3, a screw 51 of the nut 5 is screwed into the screw 33 of the mount 3 so as to be fixed.

When the structure illustrated in FIGS. 2A and 2B are employed and the nut 5 is manufactured accurately with respect to its center, the center of the nut 5 coincides with the rotational shaft only when the blade 4 and the nut 5 are attached and screwed, so that a good rotational balance can be realized.

Figure 3:
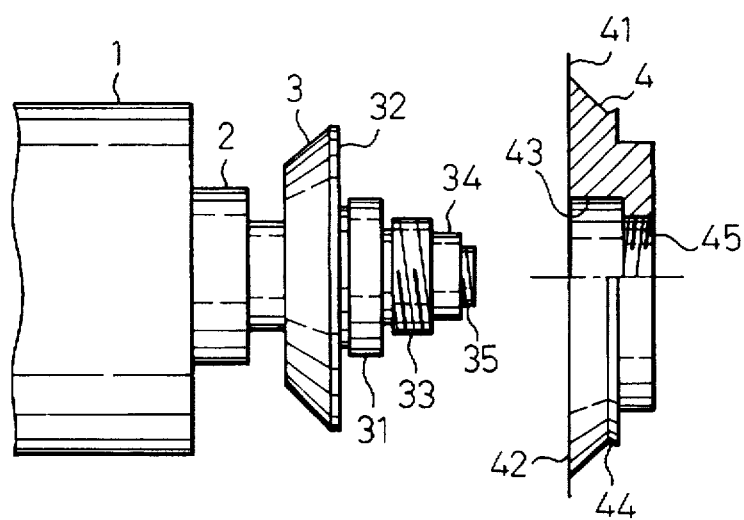
FIG. 3 is a view showing the blade mounting construction of the second embodiment.

FIG. 3 is a view showing the second embodiment of the blade mounting construction of the present invention.

As shown in FIG. 3, in the blade mounting structure of the second embodiment, the blade 4 and the nut 5 in the conventional blade mounting construction shown in FIGS. 1A and 1B are integrated into one body. The blade 4 is provided with a screw 45 to be screwed into the screw 33. When the blade 4 is attached to the mount 3, the blade 4 is rotated under the condition that a portion of the engagement portion 31 is engaged with a portion of the engagement portion 43 so that the screw 45 is screwed into the screw 33. When the blade 4 and the nut 5 are integrated into one body, it is not necessary to remove and hold the nut in the case where the blade 4 is detached. Therefore, the detaching operation can be simplified and easily automated.

Figure 4A:
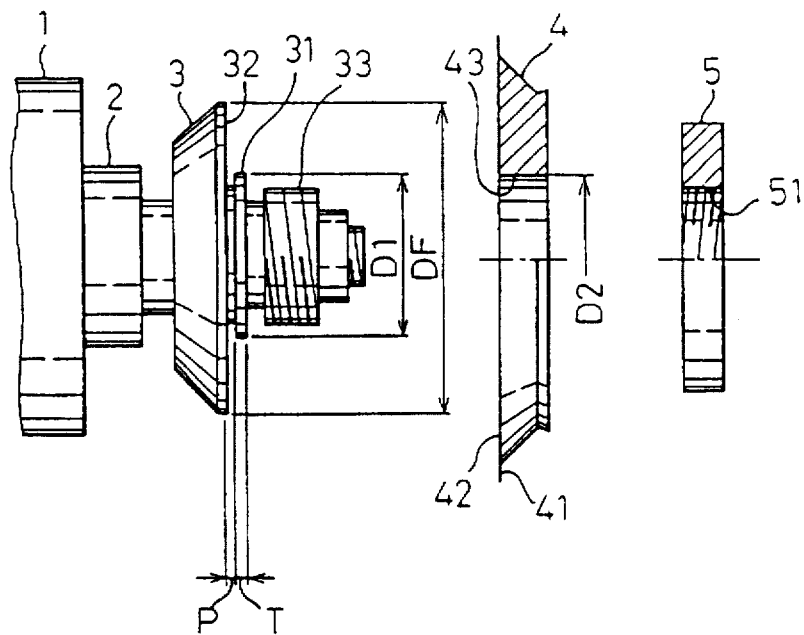
FIGS. 4A, 4B and 4C are schematic diagrams for illustrating the blade mounting structure of the third embodiment.
Figure 4B:
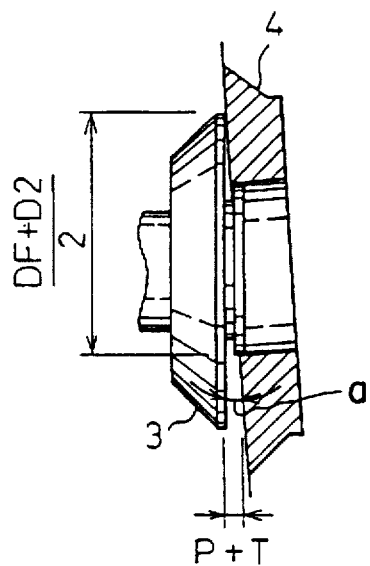
Figure 4C:
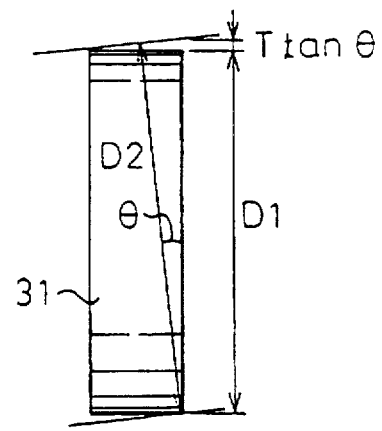

As described above, in the case where the blade 4 is attached to the mount 3, the condition of rotational balance is determined by the tolerance of the engagement portions to be engaged. The smaller the tolerance is, the more the accuracy of coincidence of the rotational shaft and the center of the blade is improved, so that the rotational balance can be improved. However, when the tolerance of the engagement portion is reduced, it becomes difficult to insert the blade into the mount. In general, the blade is made of aluminum alloy. Therefore, when the blade is inserted diagonally, an inappropriate contact condition is caused and the engagement portion is damaged, and it becomes impossible to use the blade. The third embodiment solves the above problem. FIGS. 4A, 4B and 4C are views for explaining the third embodiment of the present invention.

The blade mounting structure of the third embodiment is essentially the same as the conventional one shown in FIG. 1. However, in this case, the tolerance of engagement portions, the thickness of the first engagement portion 31, the height of the first engagement portion 31 from the flange surface, and the diameter of the flange surface are determined for a condition in which the engagement portions are not engaged under an inappropriate contact condition when the blade is inserted into the mount. This condition will be explained as follows.

As shown in FIG. 4A, the diameter of the flange surface 32 is DF, the diameter of the first engagement portion 31 is D1, the thickness of the first engagement portion 31 is T, the gap between the flange surface 32 and the first engagement portion 31 is P, and the diameter of the second engagement portion 43 is D2. The difference between D1 and D2 is the tolerance of the engagement portions.

The blade 4 is capable of being inclined within a range of the tolerance without causing inappropriate contact with respect to the rotational shaft, this range of tolerance has a maximum angle of inclination defined as θ. When the blade 4 is mounted onto the mount 3 as illustrated in FIG. 4B, the blade 4 is inclined within the range in which the blade 4 can be inclined with respect to the mount 3, under the condition that the fore ends of the engagement portions are contacted. In this case, if a portion of the blade 42 comes into contact with the surface of the flange 32, it is impossible that the blade 42 is further inclined. Accordingly, there is no possibility that an inappropriate contact occurs between the blade and the rotational shaft. Consequently, under the condition that the fore ends of the engagement portions are contacted as illustrated in FIG. 4B, the blade 4 is inclined so that a portion of the blade surface 42 comes into contact with the flange surface 32. This inclination angle may be set to be within the range in which the blade can be inclined due to the tolerance of the engagement portions. The inclination angle "a" in FIG. 4B is expressed by the following equation.

$$a = \arctan 2(P+T)/(DF+D2)$$

Concerning the maximum angle by which the blade can be inclined due to the tolerance of the engagement portions, the following equation is satisfied as shown in FIG. 4C.

$$(T \tan \theta + D1) \cos \theta = D2$$

The above equation is changed into the following equation.

$$T \sin \theta + D1 \cos \theta = D2$$

When θ is sufficiently small in the above equation, the following equation can be obtained.

$$\theta = \arcsin (D2-D1)/T$$

Accordingly, when DF, D1, T, P and D2 are determined so that the above angle "a" can be smaller than this angle θ, an inappropriate contact may not occur when the blade is inserted.

In order to actually realize the above condition, the thickness T of the first engagement portion and the gap P between the flange surface 32 and the first engagement portion 31 are reduced as small as possible, and the flange diameter DF is extended. As described above, the inclination of the blade 4 with respect to the rotational shaft is determined by the accuracy of the flange surface 32 and the blade surface 42, and the engagement portion is used only for making the center of the rotational shaft to conform with that of the blade 4. Therefore, even when the thickness T is reduced, no problem is caused except for wear caused when the blade is detached.

As explained above, according to the present invention, a blade mounting structure can be realized in which the blade is rotated in a well-balanced condition and further the blade is easily detached.

In other words, the invention requires a particular relationship of flange diameter, first engagement portion diameter, first engagement portion thickness, gap between the flange and the first engagement portion and blade opening or second engagement portion diameter such that angle a defines an inclination angle of the blade determined from the contours of the surface of the flange and blade, and angle θ defines an inclination angle of the blade determined from the tolerances of the engagement portions. When angle a is smaller than angle θ, the mating surfaces ensures a precise alignment, while the diameters of the first and second engagement portions ensure conformity of the center of the rotational shaft to the rotational center of the blade.

We claim:

1. A mounting structure for a cutting blade in a dicing apparatus, said mounting structure comprising:

a mount disposed at a fore end of a shaft of a spindle motor rotating at high speed, said mount including a first cylindrical engagement portion of which the center coincides with a rotational center, a flange perpendicular to a rotational axis, and a first screw portion;

a cutting blade attached to said mount, said cutting blade including a second engagement portion engaging with said first engagement portion, and a blade surface coming into contact with said flange; and a screw member to attach said cutting blade to said mount, wherein said cutting blade is mounted onto said mount so that said first engagement portion is engaged with said second engagement portion, a second screw portion of the screw member is screwed into said first screw portion so that said screw member presses said cutting blade against said flange surface for fixation thereto, and wherein the flange and the blade are configured such that a flange diameter DF, a diameter of the first engagement portion D1, a thickness of the first engagement portion T, a gap between the flange and the first engagement portion P, and a diameter of the second engagement portion D2 are selected such that an inclination angle $\theta$, defined by a maximum inclination of the blade with respect to the shaft due to a tolerance of the first and second engagement portions and as limited by engagement of the first and second engagement portions, is minimized, wherein $\theta = \arcsin(D2-D1)/T$, wherein an inclination angle $a = \arctan 2(P+T)/(DF+D2)$, with the inclination angle a defining an angle of inclination of the blade with respect to the flange when a surface of the flange and a surface of the blade are engaged and fore ends of the engagement portions are contacted, wherein a is smaller than $\theta$, and wherein the blade is therefore aligned with respect to the shaft by engagement of the surface of the flange and the surface of the blade, and wherein the engagement portions align rotational centers of the blade and shaft.

* * * * *